United States Patent

Shrinkle et al.

[11] Patent Number: 6,151,177
[45] Date of Patent: Nov. 21, 2000

[54] APPARATUS FOR COMPENSATING FOR NON-LINEAR CHARACTERISTICS OF MAGNETORESISTIVE HEADS

[75] Inventors: Louis J. Shrinkle, Leucadia; Matthew Schwall, Escondido, both of Calif.

[73] Assignee: Seagate Technology, Inc., Scotts Valley, Calif.

[21] Appl. No.: 08/353,681

[22] Filed: Dec. 9, 1994

[51] Int. Cl.[7] .................................................. G11B 5/09
[52] U.S. Cl. .............................................. 360/46; 360/66
[58] Field of Search ................................ 360/77.02, 46, 360/66, 113, 65, 51, 77.03; 341/59; 369/59; 375/317, 285, 287, 290, 319, 346

[56] References Cited

U.S. PATENT DOCUMENTS

| | | | |
|---|---|---|---|
| 4,477,849 | 10/1984 | Berger | 360/77.02 |
| 4,641,324 | 2/1987 | Karsh et al. | 375/317 |
| 4,755,891 | 7/1988 | Katoh et al. | 360/46 |
| 5,101,395 | 3/1992 | Cardero et al. | 369/59 |
| 5,220,546 | 6/1993 | Fennema | 360/77.03 X |
| 5,283,521 | 2/1994 | Ottesen et al. | 324/225 |
| 5,311,178 | 5/1994 | Pan et al. | 341/59 |
| 5,412,518 | 5/1995 | Christner et al. | 360/66 |
| 5,418,660 | 5/1995 | Sato et al. | 360/65 |
| 5,420,726 | 5/1995 | Mathews et al. | 360/46 |
| 5,436,773 | 7/1995 | Hanson | 360/66 |
| 5,469,305 | 11/1995 | Madsen et al. | 360/51 |

FOREIGN PATENT DOCUMENTS

WO 94/19793  1/1994  WIPO.

*Primary Examiner*—Paul Loomis
*Assistant Examiner*—Dan I. Davidson
*Attorney, Agent, or Firm*—Shawn B. Dempster; Edward P. Heller

[57] ABSTRACT

An apparatus that compensates for the asymmetry and the baseline shift in the signal generated by a magnetoresistive head. The apparatus stores a first correction factor for the baseline shift, a second correction factor for correcting the amplitude of the positive portion of the signal and a third correction factor for correcting the amplitude of the negative portion of the signal. The first correction factor for correcting for baseline shift is added to the signal generated by the magnetoresistive head to generate a baseline corrected signal. The baseline corrected signal is then monitored for positive and negative excursions from the baseline and the positive excursions are multiplied by the second correction factor and the negative excursions are multiplied by the third correction factor for generating a compensated signal.

10 Claims, 2 Drawing Sheets

APPARATUS FOR COMPENSATING FOR NON-LINEAR CHARACTERISTICS OF MAGNETORESISTIVE HEADS

BACKGROUND OF THE INVENTION

The present invention is generally related to magnetoresistive heads used in disk drive systems for recovering data stored on magnetic disk. In particular, the present invention relates to an apparatus for compensating for the non-linear response to flux exhibited by magnetoresistive head.

Magnetoresistive heads are read only devices that are being used in both flexible and rigid magnetic memory systems, such as disk drive system, to recover data recorded on the magnetic media of the magnetic memory system. Magnetoresistive heads respond to the magnitude of the flux being sensed by the magnetoresistive head where inductive heads respond to the rate of change in flux being sensed by the inductive head. This is one of the characteristics of the magnetoresistive head that have resulted in an increase in the areal density that data can be recorded on the magnetic medium over that which was previously realized using inductive heads.

The magnetoresistive head has a non-linear response to the magnitude of flux as a function of the orientation of the flux. This results in the signal generated by the magnetoresistive head being asymmetrical, that is the magnitude of the positive portion of the signal will be different than the magnitude of the negative portion of the signal with all other factors being constant except for the orientation of the flux. The asymmetry of the signal further causes a baseline shift in the signal due to the AC coupling employed in recovering the signal generated by the magnetoresistive head.

The combined effect of the asymmetry and baseline shift in the signal can cause a data detector, which recovers the data from the signal, to have an increase in the number of errors in the decoded data because typical data detector assumed a symmetrical signal with no baseline shift.

Many disk drive systems use a digital data detector to recover the data from the analog signal generated by a magnetoresistive head. In such systems, an analog to digital (A/D) converter is used to convert the analog signal into a series of digital signals which will be used by a data detector to detect the data encoded in the analog signal. The value of the digital signal is affected by the asymmetry and the baseline shift of the analog signal being sampled such that the value of the digital signal produced from the analog signal being sampled can have a different value than the digital signal would have had if the analog signal was symmetrical and had no baseline shift. The digital detector expects the output of the analog to digital converter to produce digital signals having specified values based upon a symmetrical analog signal with no baseline shift being provided to the analog to digital converter. The resulting differences in value of the digital signals produced by the analog to digital converter in response to an asymmetrical analog signal having a baseline shift can cause the data detector to erroneously interpret the digital signal produced by the analog to digital converter.

SUMMARY OF THE INVENTION

Briefly, the present invention provides an apparatus which stores a first correction factor for correcting the baseline shift from a baseline reference, a second correction factor for correcting the peak amplitude of the positive portion of the signal generated by the magnetoresistive head to a specified value and a third correction factor for negative peak amplitude of the negative portion of the signal generated by the magnetoresistive head to a specified value. The apparatus adds the first correction factor to the signal generated by the magnetoresistive head to generate a baseline corrected signal. The apparatus monitors the value of the baseline corrected signal for positive and negative excursions from the baseline reference and then multiplies the positive excursions by the second correction factor and the negative excursions by the third correction factor thereby providing a compensated signal which has been compensated for the non-linear response of the magnetoresistive head to the orientation of flux and for baseline shift.

An advantage of the invention is that the apparatus will compensate for asymmetry and baseline shift in the signal generated by a magnetoresistive head.

Another advantage of the invention is that when the compensated signal is detected by the data detector fewer errors will result in detected data provided by the data detector.

BRIEF DESCRIPTION OF THE DRAWINGS

The invention will be described with respect to the particular embodiments thereof and reference will be made to the drawings, in which:

FIG. 2B is a representation the analog signal of

FIG. 2A which has been corrected for base line shift; and

DETAILED DESCRIPTION OF THE INVENTION

The apparatus of the invention is described in a digital form for use between the analog to digital converter and the digital data detector in a digital read channel. Where the disk drive system employs an analog data detector in an analog read channel or the apparatus of the invention is to be inserted prior to the digital to analog converter in a digital read channel, it is well within the state of the art to convert the digital apparatus of the invention disclosed herein into an analog apparatus performing the same functions.

Figure 1:
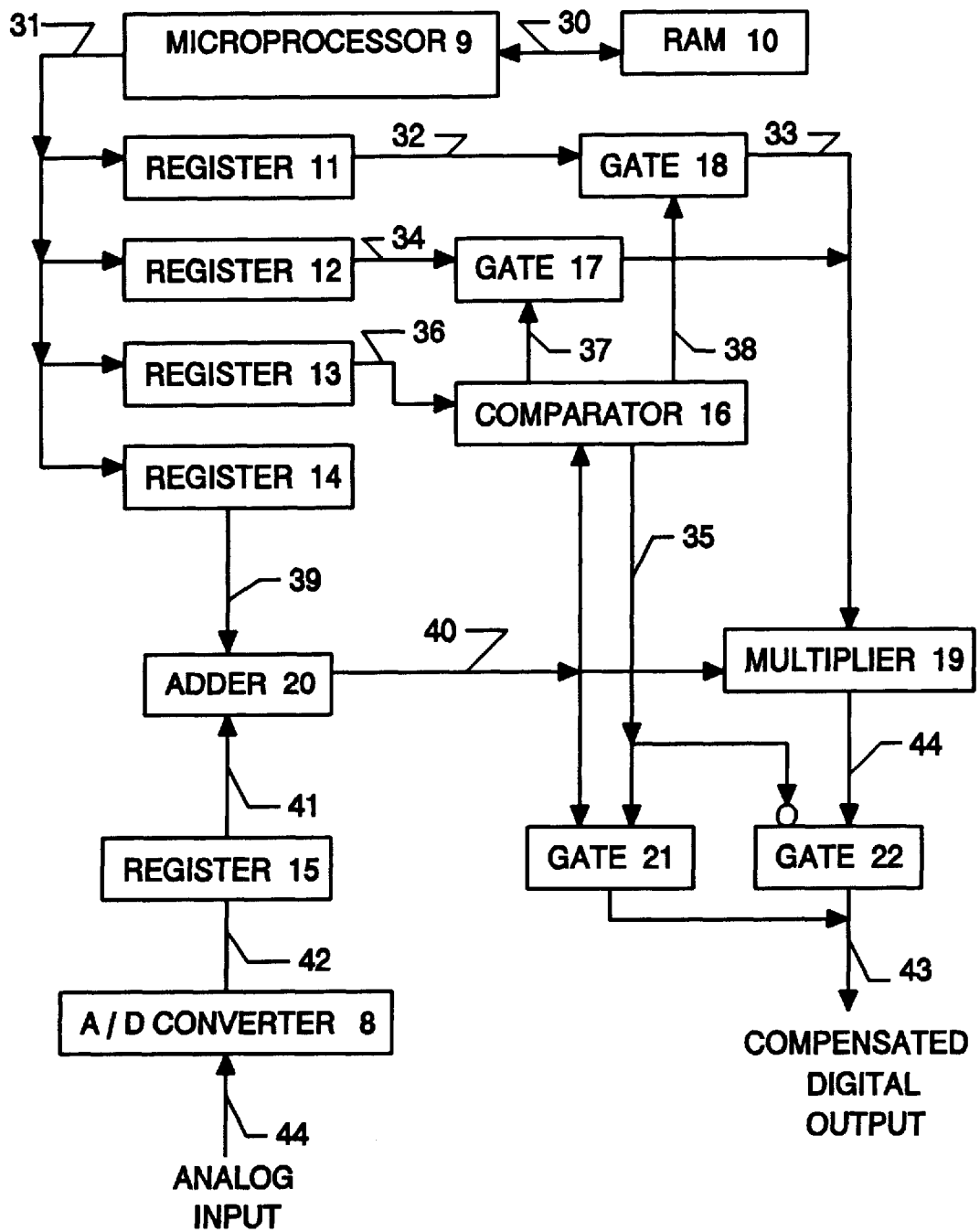
FIG. 1 is a block diagram of a digital apparatus for compensating for the asymmetry and baseline shift in a signal generated by a magnetoresistive head.
Figure 2A:
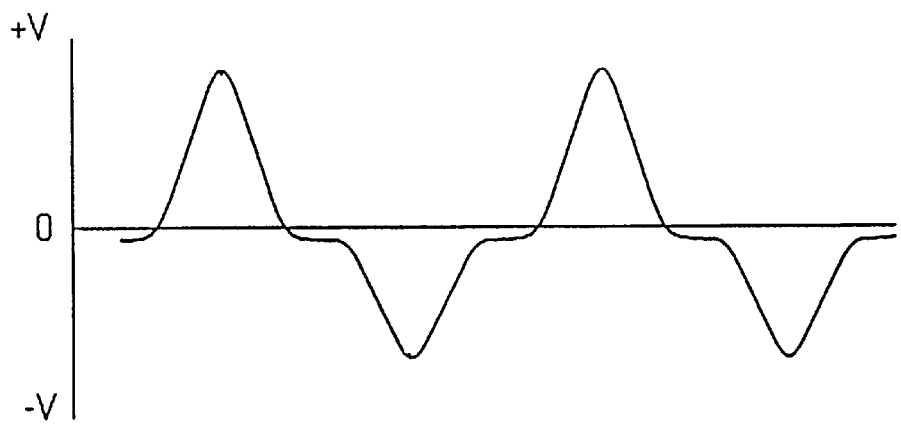
FIG. 2A is a representation of an analog signal generated by a magnetoresistive head having asymmetry and baseline shift.

The digital apparatus of the invention is shown in FIG. 1. The analog signal generated by the magnetoresistive head is provided on line 44 to the analog to digital converter 8. The analog signal may have been processed by the read channel but the resulting analog signal will still have the asymmetry and baseline shift of the original analog signal. The digital to analog converter 8 receives an analog signal which is illustrated in FIG. 2A. The analog signal is shown, for example purposes, as having a negative baseline shift and asymmetry where the positive excursion is greater in amplitude than the negative excursion. A positive peak signifies a point of flux reversal from a first orientation to a second orientation and a negative peak signifies a point of flux reversal from a second orientation to a first orientation. The analog signal will have a zero value when the positive and negative charges of the system coupling capacitors are balanced. Data detectors identify the positive peaks, the negative peaks and the zero values of the signal in recovering the data from the signal and expect the amplitude of the positive peak to ideally have a value of +1 and the amplitude of the negative peak to ideally have a value of −1 and the baseline to have a value of 0.

A typical disk drive system includes a plurality of magnetic disks where each side of each disk may have an associated magnetoresistive head for recovering the data recorded on that side of that magnetic disk. Therefore, the contents of RAM 10, which is connected to microprocessor 9 by bus 30, will contain for each magnetoresistive head used in the disk drive system a first correction factor for compensating for baseline shift from a referenced baseline value, a second correction factor for correcting the amplitude of the positive portion of the signal generated by the magnetoresistive head and a third correction factor for correcting the amplitude of the negative portion of the signal generated by the magnetoresistive head. RAM 10 also includes a baseline reference value which is normally zero but which can be of any value designated by the designer of the disk drive system. Where the baseline reference value B is not zero then the ideal values of the positive peak will be B+A and the ideal value of the negative peak will be B−A, where A is the ideal magnitude of the positive and negative peaks.

Microprocessor 9 is connected to registers 11, 12, 13 and 14 by bus 31. When the disk drive system is first started up, microprocessor 9 will retrieve the baseline reference value from RAM 10 and will then store the value for the baseline reference value into register 13. During each head selection operation, microprocessor 9 will retrieve the first, second and third correction factors from RAM 10 for the magnetoresistive head being selected and will store the first correction factor into register 14, the second correction factor into register 11 and the third correction factor into register 12. At this time the apparatus has been initialized such that the apparatus can compensate each digital signal generated from the analog signal on line 44.

Each digital signal generated by analog to digital converter 8 is transferred into register 15 via bus 42. Register 15 may be eliminated if the analog to digital converter 8 maintains the value of the digital signal a sufficient length of time for the digital signal to be compensated and for an associated compensated signal to be presented for further processing on line 43. Adder 20 adds the digital signal on bus 41 from register 15 to the first correction factor on bus 39 from register 14. Adder 20 produces a digital baseline corrected signal on bus 40.

Figure 2B:
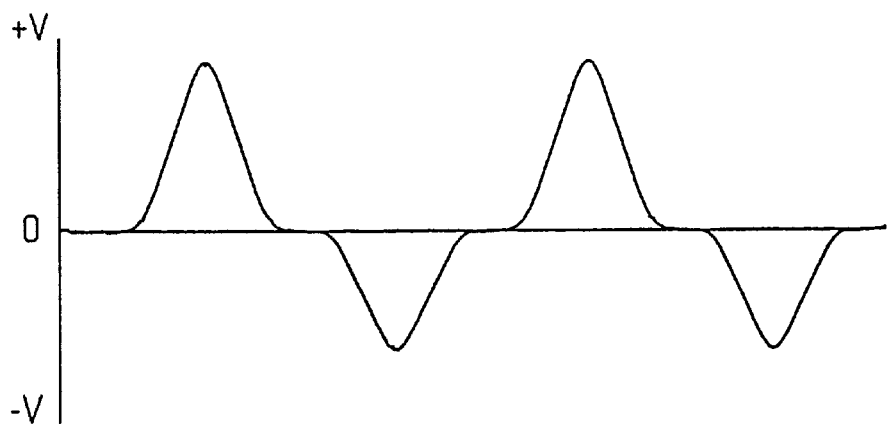

FIG. 2B shows the analog signal of FIG. 2A after correcting the analog signal of FIG. 2A for the baseline shift. Essentially the baseline corrected signals will have a value that would have been produced by the analog to digital converter 8 if the analog signal of FIG. 2B had been provided to the analog to digital converter 8. The baseline offset must be corrected before amplitude corrections can be made.

Comparator 16 compares the baseline corrected signal on line 40 to the baseline reference value stored in register 13 on bus 36. If the baseline corrected signal is greater than the baseline reference value then comparator 16 will generate a first signal on line 38 to condition gate 18 to transfer the second correction factor on bus 32 from register 11 onto bus 33 to multiplier 19. If the baseline corrected signal is less than the baseline reference value then comparator 16 will generate a second signal on line 37 to condition gate 17 whereby the third correction factor on bus 34 from register 12 is transferred onto bus 33 to multiplier 19. If the baseline corrected signal is equal to the baseline reference value then comparator 16 will generate a first state of a third signal on line 35 to condition gate 21 to transfer the baseline corrected signal on bus 40 onto bus 43 as a compensated digital signal and to decondition gate 22. If the baseline corrected signal is not equal to the baseline reference value then comparator 16 will generate a second state of the third signal on line 35 to condition gate 22 to transfer the amplitude corrected signal on bus 44 from multiplier 19 onto bus 43 as a compensated digital signal and to decondition gate 21.

Multiplier 19 multiples the baseline corrected digital signal on bus 40 by either the selected second or third correction factor now appearing on bus 33 to generate an amplitude corrected signal on bus 44.

Figure 2C:
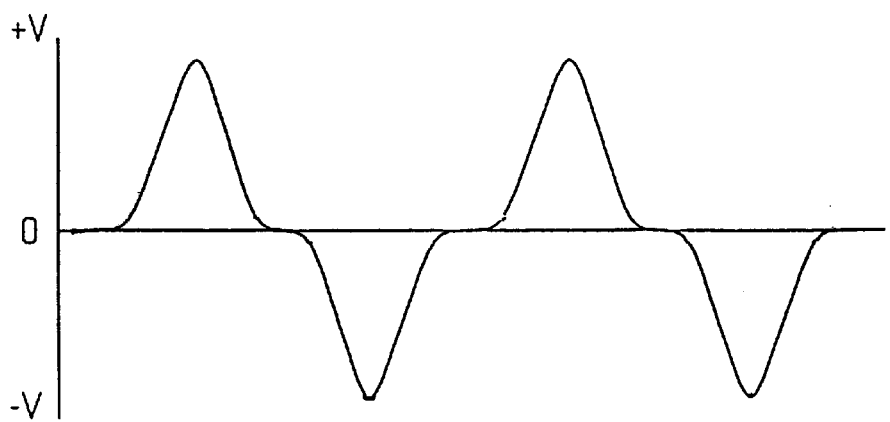
FIG. 2C is a representation of the analog signal of FIG. 2A which has been corrected for asymmetry and baseline shift.

FIG. 2C shows the analog signal of FIG. 2B after correcting the analog signal of FIG. 2B for asymmetry. Essentially the amplitude corrected signal will have a value that would have been produced by the analog to digital converter 8 if the analog signal of FIG. 2C would had been provided to the analog to digital converter 8.

It has been found that many magnetoresistive heads produce an asymmetrical signal where either the positive or negative peak of the asymmetrical signal has the correct amplitude and does not have to be corrected. In such a case the correction factor for the portion of the asymmetrical signal having the correct amplitude would be one and the apparatus of FIG. 1 could be used as shown.

Alternatively, if all magnetoresistive heads in the disk drive system had positive peaks of the correct amplitude then no second correction factor would have to be stored in RAM 10. FIG. 1 would be modified by deleting register 11 and gate 18. Comparator 16 would not generate the first signal to condition gate 18, the first state of the third signal would be generated when the baseline corrected signal was either equal to or greater than the baseline reference signal and the second state of the third signal would be generated when the baseline corrected signal was less than the baseline reference signal.

If all magnetoresistive heads in the disk drive system had negative peaks of the correct amplitude then no third correction factor would have to be stored in RAM 10. FIG. 1 would be modified by deleting register 12 and gate 17. Comparator 16 would not generate the second signal to condition gate 17, the first state of the third signal would be generated when the baseline corrected signal was either equal to or less than the baseline reference signal and the second state of the third signal would be generated when the baseline corrected signal was greater than the baseline reference signal.

Finally, if the baseline reference value was equal to zero then gates 21 and 22 may be eliminated and the compensated digital signal will always be the amplitude corrected signal from multiplier 19. Comparator 19 would condition either gate 17 or 18 when the baseline corrected signal was equal to the baseline reference value. When the baseline corrected signal is equal to zero, multiplier 19 will produce an amplitude corrected signal having the correct value of zero.

The value for the first, second and third correction factors for each magnetoresistive head in a disk drive system may be derived in many ways. Typically the correction factors are generated after the magnetoresistive heads have been installed in the disk drive system sin the disk effect that the electronics in the disk drive system has on the baseline shift or the symmetry of the analog signal might also be compensated for. Generally a program is written and run under computer control to obtain the first second and third correction factors. A data pattern is recorded on the magnetic disk, such that the time of the occurrence of the positive peaks, the negative peaks and baseline crossings is known. The program stores the baseline reference value in register 14 and then collects a data base of a large number of digital values at the time when the baseline should have a zero value. Then a first correction factor is derived from that data base by the use of any one of a number of statistical error analysis techniques to compensate for the baseline shift in the analog signal. The first correction factor is then stored in register 14. A data base consisting of a large number of digital values for the positive peaks is collected and then a second correction factor is derived from that data base, by the use of any one of a number of statistical error analysis techniques, for compensating the amplitude of the positive peaks to a specified value. A data base consisting of a large number of digital values for the negative peaks is collected and then a third correction factor is derived from that data base, by the use of any one of a number of statistically error analysis techniques, for compensating the amplitude of the negative peaks to the specified value.

This procedure is performed for each magnetoresistive head used in the disk drive system and the first, second and third correction factors are stored in RAM 10 at the designated address for each of the magnetoresistive heads. Of course, if the apparatus of FIG. 1 had been modified so as not to use either the second or third correction factor, then that correction factor would not have to be generated or stored in RAM 10 for each of the magnetoresistive heads.

While the invention has been particularly shown and described with reference to the described embodiment therefore, it will be understood by those skilled in the art that changes in form and detail may be made therein without departing from the spirit and scope of the invention. Given the above disclosure of general concepts and specific embodiments, the scope of the protection sought is defined by the following.

What is claimed is:

1. An apparatus for generating a digital compensated signal derived from an analog signal generated by a magnetoresistive head in a magnetic memory system where said analog signal has a baseline shift and has asymmetry in the form of positive peaks and negative peaks in said analog signal having different amplitudes, said apparatus comprising:

a converting means for converting said analog signal into a digital signal where said digital signal is comprised of a series of digital samples;

processing means for processing each of said digital samples into a compensated sample where the resulting series of compensated samples from said compensated signal, said compensated signal being a digitized representation of said analog signal compensated for baseline shift and asymmetry where said compensated signal has digitized positive peaks and digitized negative peaks of a defined absolute digital value, said processing means includes:

a baseline correction means responsive to a digital sample from said converting means for generating a digital baseline corrected sample from said digital sample; and an asymmetry correction means responsive to the baseline corrected sample from said baseline correction means for generating the digital compensated signal having positive and negative peaks of a defined absolute amplitude and no baseline shift.

2. The apparatus of claim 1 wherein said baseline correction means comprises;

a register for storing a digital baseline correction value which corrects for the baseline shift associated with said magnetoresistive head generating the analog signal; and an adder for generating said baseline corrected sample by adding said baseline correction value to said sample presently stored in said converting means.

3. The apparatus of claim 2 wherein said asymmetry correction means comprises:

a register for storing a digital positive correction value associated with the magnetoresistive head generating said analog signal where said positive correction value will cause a digitized positive peak in said compensation signal, which is derived from said positive peak of said analog signal, to have an absolute peak value equal to said defined absolute value;

a register for storing a digital negative correction value associated with the magnetoresistive head generating said analog signal where said negative correction value will cause said digitized negative peak in said compensated signal, which is derived from said negative peak of said analog signal, to have an absolute peak value equal to said defined absolute value;

a register for storing a digital reference baseline value;

a selection means for selecting said positive correction value when said baseline corrected sample is greater than said reference baseline value and said negative correction value when said baseline corrected sample is less than said reference baseline value; and a multiplier for generating an amplitude adjusted sample by multiplying said baseline corrected sample by said positive correction value when selected by said selection means and by said negative correction value when selected by said selection means.

4. The apparatus of claim 3 wherein said selection means comprises:

a comparator means for generating a first signal when said baseline corrected sample is greater than said reference baseline value, a second signal when said baseline corrected sample is less than said baseline reference value, a first state of a third signal when said baseline corrected sample is equal to said reference baseline value and a second state of said third signal when said baseline correted sample is not equal to said reference baseline value;

a first means for providing to said multiplier said positive correction value in response to said first signal and said negative correction value in response to said second signal; and a second means for providing said baseline corrected sample as said compensated sample when said comparator generates said first state of said third signal and said amplitude corrected sample as said compensated sample when said comparator generates said second state of said third signal.

5. The apparatus of claim 2 wherein said asymmetry correction means comprises:

a register for storing a digital negative correction value associated with the magnetoresistive head generating said analog signal where said negative correction value will cause said digitized negative peak in said compensated signal, which is derived from said negative peak of said analog signal, to have an absolute peak value equal to said defined absolute value;

a register for storing a digital reference baseline value;

a selection means for selecting said negative correction value when said baseline corrected sample is less than said reference baseline value; and a multiplier for generating an amplitude adjusted sample by multiplying said baseline corrected sample by said negative correction value when selected by said selection means.

6. The apparatus of claim 5 wherein said selection means comprises:

a comparator means for generating a first signal when said baseline corrected sample is less than said baseline reference value, a first state of a second signal when said baseline corrected sample is equal to or greater than said reference baseline value and a second state of said third signal when said baseline corrected sample is less than said reference baseline value;

a first means for providing to said multiplier said negative correction value in response to said first signal; and a second means for providing said baseline corrected sample as said compensated sample when said comparator generates said first state of said second signal and said amplitude corrected sample as said compensated sample when said comparator generates said second state of said second signal.

7. The apparatus of claim 2 wherein said asymmetry correction means comprises:

a register for storing a digital positive correction value associated with the magnetoresistive head generating said analog signal where said positive correction value will cause said digitized positive peak in said compensated signal, which is derived from said positive peak of said analog signal, to have an absolute peak value equal to said defined absolute value;

a register for storing a digital reference baseline value;

a selection means for selecting said positive correction value when said baseline corrected sample is greater than said reference baseline value; and a multiplier for generating an amplitude adjusted sample by multiplying said baseline corrected sample by said positive correct ion value when selected by said selection means.

8. The apparatus of claim 7 wherein said selection means comprises:

a comparator means for generating a first signal when said baseline corrected sample is greater than said baseline reference value, a first state of a second signal when said baseline corrected sample is equal to or less than said reference baseline value and a second state of said third signal when said baseline corrected sample is greater than said reference baseline value;

a first means for providing to said multiplier said positive correction value in response to said first signal; and a second means for providing said baseline corrected sample as said compensated sample when said comparator generates said first state of said second signal and said amplitude corrected sample as said compensated sample when said comparator generates said second state of said second signal.

9. The apparatus of claim 2 wherein said asymmetry correction means comprises:

a register for storing a digital positive correction value associated with the magnetoresistive head generating said analog signal where said positive correction value will cause a digitized positive peak in said compensation signal, which is derived from said positive peak of said analog signal, to have an absolute peak value equal to said defined absolute value;

a register for storing a digital negative correction value associated with the magnetoresistive head generating said analog signal where said negative correction value will cause said digitized negative peak in said compensated signal, which is derived from said negative peak of s aid analog signal, to have an absolute peak value equal to said defined absolute value;

a register for storing a digital reference baseline value equal to zero;

a selection means for selecting said positive correction value when said baseline corrected sample is greater than said reference baseline value, said negative correction value when said baseline corrected sample is less than said reference baseline value and either said positive correction value or said negative correction value when said baseline corrected sample is equal to said reference baseline value; and a multiplier for generating a compensated sample by multiplying said baseline corrected sample by said positive correction value when selected by said selection means and by said negative correction value when selected by said selection means.

10. The apparatus of claim 9 wherein said selection means comprises:

a comparator means for generating a first signal when said baseline corrected sample is greater than said reference baseline value, a second signal when said baseline corrected sample is less than said baseline reference value, and either said first signal or said second signal when said baseline corrected sample is equal to said reference baseline value;

a first means for providing to said multiplier said positive correction value in response to said first signal and said negative correction value in response to said second signal.

* * * * *